United States Patent [19]

Okuyama

[11] Patent Number: 5,583,830
[45] Date of Patent: Dec. 10, 1996

[54] ELECTRONIC APPLIANCE EQUIPPED WITH SENSOR CAPABLE OF VISUALLY DISPLAYING SENSED DATA

[75] Inventor: Masayoshi Okuyama, Higashiyamato, Japan

[73] Assignee: Casio Computer Co., Ltd., Tokyo, Japan

[21] Appl. No.: 265,662

[22] Filed: Jun. 24, 1994

[30] Foreign Application Priority Data

Jun. 30, 1993 [JP] Japan .................................. 5-160721
Jun. 30, 1993 [JP] Japan .................................. 5-160722

[51] Int. Cl.$^6$ ........................... G04B 19/04; G04B 25/00; G01L 7/12
[52] U.S. Cl. ..................... 368/11; 368/223; 73/37; 364/556
[58] Field of Search .................... 368/9, 10, 11, 368/76, 80, 82, 223, 239; 340/612, 614, 626; 364/556, 558, 561; 73/37, 37.5, 37.6, 290 R, 299, 300, 301, 426, 427

[56] References Cited

U.S. PATENT DOCUMENTS

| 3,696,610 | 10/1972 | Charbonnier . | |
|---|---|---|---|
| 4,242,980 | 1/1981 | Go . | |
| 4,835,716 | 5/1989 | Tamaki et al. . | |
| 5,299,177 | 3/1994 | Koch | 368/73 |
| 5,440,527 | 8/1995 | Okamoto | 368/80 |

FOREIGN PATENT DOCUMENTS

| 4447580A1 | 9/1991 | European Pat. Off. . |
| 0373982 | 6/1990 | France . |
| 2651542 | 5/1978 | Germany . |
| 3318801A1 | 11/1984 | Germany . |

*Primary Examiner*—Vit W. Miska
*Attorney, Agent, or Firm*—Frishauf, Holtz, Goodman, Langer & Chick

[57] ABSTRACT

In an electronic appliance equipped with an electronic wristwatch equipped with a sensor, a trend in various variations such as temperatures, altitude and waterdepths can be visually and intuitively recognized. In the electronic appliance, measurement data constructed of plural digits are acquired in response to output signals from the sensor. The upper digit data among the plural digits of measurement data are digitally displayed by way of an electronic/optical digital display unit, e.g., an LCD display, whereas the lower digit data among the plural digits of measurement data except for the plural digits are displayed by way of either a pointer type display unit, or an electronic/optical analog display unit, e.g., a meter.

48 Claims, 10 Drawing Sheets

TREND DISPLAY INDICATION

| M | N | L |
|---|---|---|
| PS | HS | TS |
| PK | PN | PF |
| HK | HN | HF |
| PZ | HZ | TZ |
| TI | NI | Q |
| R | J | |

FIG. 4A

| ATMOSPHERIC PRESSURE | TEMPERATURE | TIME |
|---|---|---|
| ⋮ | ⋮ | ⋮ |
|   |   |   |

} PM (48)

| ALTITUDE | TEMPERATURE | TIME |
|---|---|---|
| ⋮ | ⋮ | ⋮ |
|   |   |   |

} HM (48)

| TEMPERATURE | TIME |
|---|---|
| ⋮ | ⋮ |
|   |   |

ELECTRONIC APPLIANCE EQUIPPED WITH SENSOR CAPABLE OF VISUALLY DISPLAYING SENSED DATA

BACKGROUND OF THE INVENTION

1. Field of the Invention

The present invention generally relates to an electronic appliance equipped with various sensors for acquiring various measurement data such as altitude, water-depths, atmospheric pressure, and temperatures and for displaying these measurement data. More specifically, the present invention is directed to an electronic wristwatch capable of visually displaying variation trends in these measurement data.

2. Description of the Prior Art

Conventionally, various electronic wristwatches have been developed which are equipped with a sensor to display not only time data, but also atmospheric pressure data, water-depth data, or temperature data. For instance, U.S. Pat. No. 4,835,716 entitled to Tamaki et al., assigned to the same assignee of this patent application, discloses the electronic wristwatch having the electronic/optical display unit for displaying the water-depth data and the atmospheric pressure data in a digital form, or an analog form. Also, U.S. Pat. No. 3,696,610 entitled to Charbonnier, issued on Oct. 10, 1972 discloses the wristwatch for displaying the various diving data in an analog form by torn-ting the pointer.

These conventional wristwatches own inherent drawbacks. In the case of the digital display mode, it is difficult to intuitively grasp changing degrees in the digitally displayed values. In the case of the analog display mode, such a changing degree in the analog-displayed values may be readily recognized. However, in order that the various values in a wide range should be displayed within a limited display space, a large value should be displayed by moving the pointer over a short moving distance. As a consequence, since the pointer could not be consciously moved in response to a very small change, there is another problem that such a small change in the measurement values cannot be easily recognized.

SUMMARY OF THE INVENTION

An object of the present invention is to provide an electronic appliance equipped with a sensor by combining a digital type representation with a pointer type representation to complementarily solve the conventional drawbacks owned in the respective display modes.

Another object of the present invention is to provide an electronic appliance equipped with a sensor, by which variations in measured atmospheric pressure, altitude, and temperatures can be intuitively recognized, and also approximate values thereof can be clearly read.

A further object of the present invention is to provide an electronic appliance equipped with a sensor, capable of clearly grasping a very small change in the measured data.

To achieve the above explained objects, an electronic appliance equipped with a sensor, is arranged by: a sensor; a converting unit for producing measurement data having a plurality of numeral digits based upon the output signal from the sensor; an electronic/optical digital display unit for digitally displaying data having an upper digit among the plural digits of the measurement data; and a pointer type display unit for displaying lower digit data among the plural digits of the measurement data except for the data having the upper digit by way of a movable pointer.

With the above-described arrangement, the electronic appliance is constructed by combining the digital type data display and the pointer type data display, so that the changes in the measured data such as atmospheric pressure, altitude, and temperatures can be intuitively grasped. Moreover, the approximate numeral values of these measured data can be clearly read, and a very small change in the measured data can be conspicuously recognized.

BRIEF DESCRIPTION OF THE DRAWINGS

For a better understanding of the present invention, reference is made to a detailed description to be read in conjunction with the accompanying drawings, in which:

FIG. 4A schematically shows a structure of a register allocated to a predetermined region of the RAM employed in the circuit arrangement of FIG. 3;

FIG. 4B schematically represents a structure of a data storage memory allocated to a preselected region of the RAM employed in the circuit arrangement of FIG. 3;

DETAILED DESCRIPTION OF THE PREFERRED EMBODIMENTS

Referring now to drawings, an electronic appliance equipped with a sensor according to a currently preferred embodiment of the present invention, will be described in detail.

OUTER APPEARANCE OF FIRST ELECTRONIC WRISTWATCH

Figure 1:
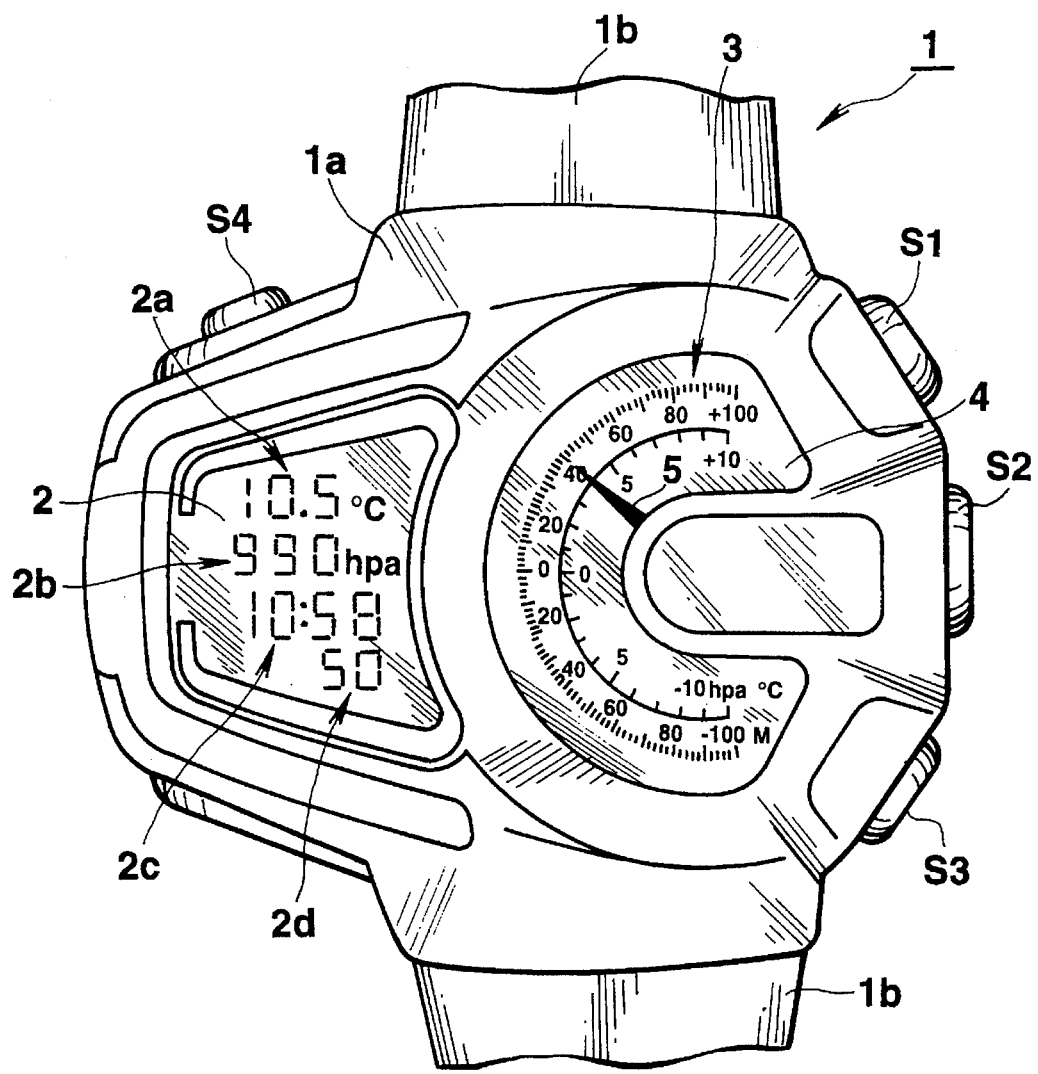
FIG. 1 schematically shows an outer appearance of an electronic wristwatch equipped with a sensor corresponding to an electronic appliance equipped with a sensor according to a presently preferred embodiment of the present invention.

FIG. 1 is a plan view for schematically showing an electronic wristwatch i equipped with a sensor, corresponding to an electronic appliance equipped with a sensor according to a first presently preferred embodiment of the present invention. As shown in FIG. 1, a digital type display unit 2 is provided on an upper left portion of this first electronic wristwatch 1, and is capable of displaying various data in four-stage mode. That is, temperatures are displayed on the uppermost staged (namely, first staged) digital display portion 2a. Either atmospheric pressure, or altitude is displayed on the second staged digital display portion 2b. Further, hours and minutes of time are displayed on the third staged digital display portion 2c, and seconds of time are displayed on the lowermost fourth staged digital display portion 2d. Also, this fourth staged digital display portion 2d displays a time period indicative of a selected trend in a trend display mode (will be described later).

On the other hand, a pointer type display unit 3 is provided on an upper right portion of the first electronic wristwatch 1. The pointer display unit 3 is so constructed that a pointer 5 is rotated on a dial plate 4. Both a scale having a short interval and a scale having a long interval are printed out on this dial plate 4.

The scale with a short interval is employed to display altitude. Precisely speaking, plus and minus arabic numerals of 20, 40, 80, 80 and 100 are printed near this short interval scale with respect to a center of this scale as "O". In addition, symbol "M (meter)" indicative of unit of altitude is printed on a lower right portion of this scale. On the other hand, the scale with a long interval is employed to display both temperatures and atmospheric pressure. Plus and minus arabic numerals of 5 and 10 are printed near this long interval scale with regard to a center of this scale as "O", whereas symbol "hpa (hecto Pascal)" representative of atmospheric pressure and symbol "°C" indicative of temperatures are printed on a lower portion of this long interval scale (see FIG. 1).

Accordingly, the altitude can be displayed within a range of plus and minus 100 meters, the atmospheric pressure (or pressure) can be displayed in a range of plus and minus 10 hecto Pascal, and the temperatures can be displayed in a range of plus and minus 10° C. on this pointer type display unit 3.

As illustrated in FIG. 1, function selecting switches S1 to S4 are provided on side surfaces of this first electronic wristwatch 1. That is, the first function selecting switch S1 is a mode selecting switch for selecting a measurement mode and a trend display mode. The second function selecting switch S2 is an operation switch for selecting atmospheric pressure, altitude, or temperature. The third function selecting switch S3 is an operation switch for sequentially changing two sets of measurement data which are compared with each other in the trend display mode. The fourth function selecting switch S4 is an operation switch for changing time intervals between two sets of measurement data to be compared with each other in the trend display mode.

The first electronic wristwatch 1 is further constructed by that watchbands 1b, 1b are mounted on both end portions of a case 1a in which various watch parts are installed.

Figure 2A:
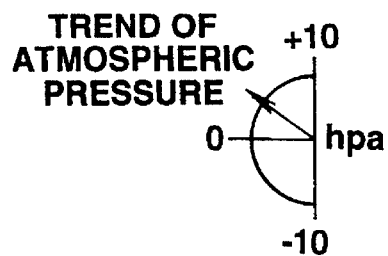
FIGS. 2A, 2B, and 2C illustrate display conditions of a pointer type display unit employed in the electronic wristwatch of FIG. 1.
Figure 2B:
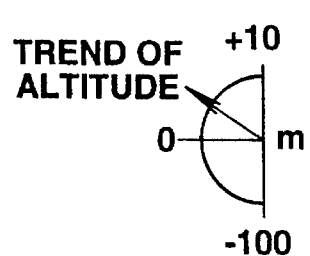
Figure 2C:
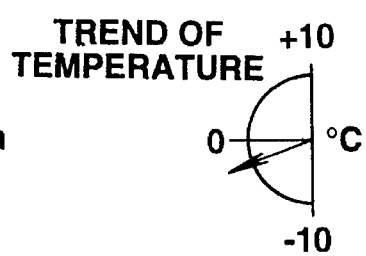

FIGS. 2A to 2C schematically illustrate trend representations made by the pointer type display unit 3, namely a trend of atmospheric pressure, a trend of altitude, and a trend of temperatures. The trend representations can provide visual observations of an increase trend, no change, or a decrease trend existing in variations between the preceding measurement data and the succeeding measurement data. These measurement data have been acquired in a predetermined time difference. When the pointer 5 points out the upper side of the display area from the horizontal display area, this variation implies the "increase trend". Conversely, when the pointer 5 points out the lower side of the display area from the horizontal display area, this variation implies the "decrease trend". Then, when the pointer 5 does not change its pointing area, this condition implies "no change".

CIRCUIT ARRANGEMENT OF FIRST ELECTRONIC WRISTWATCH

Figure 3:
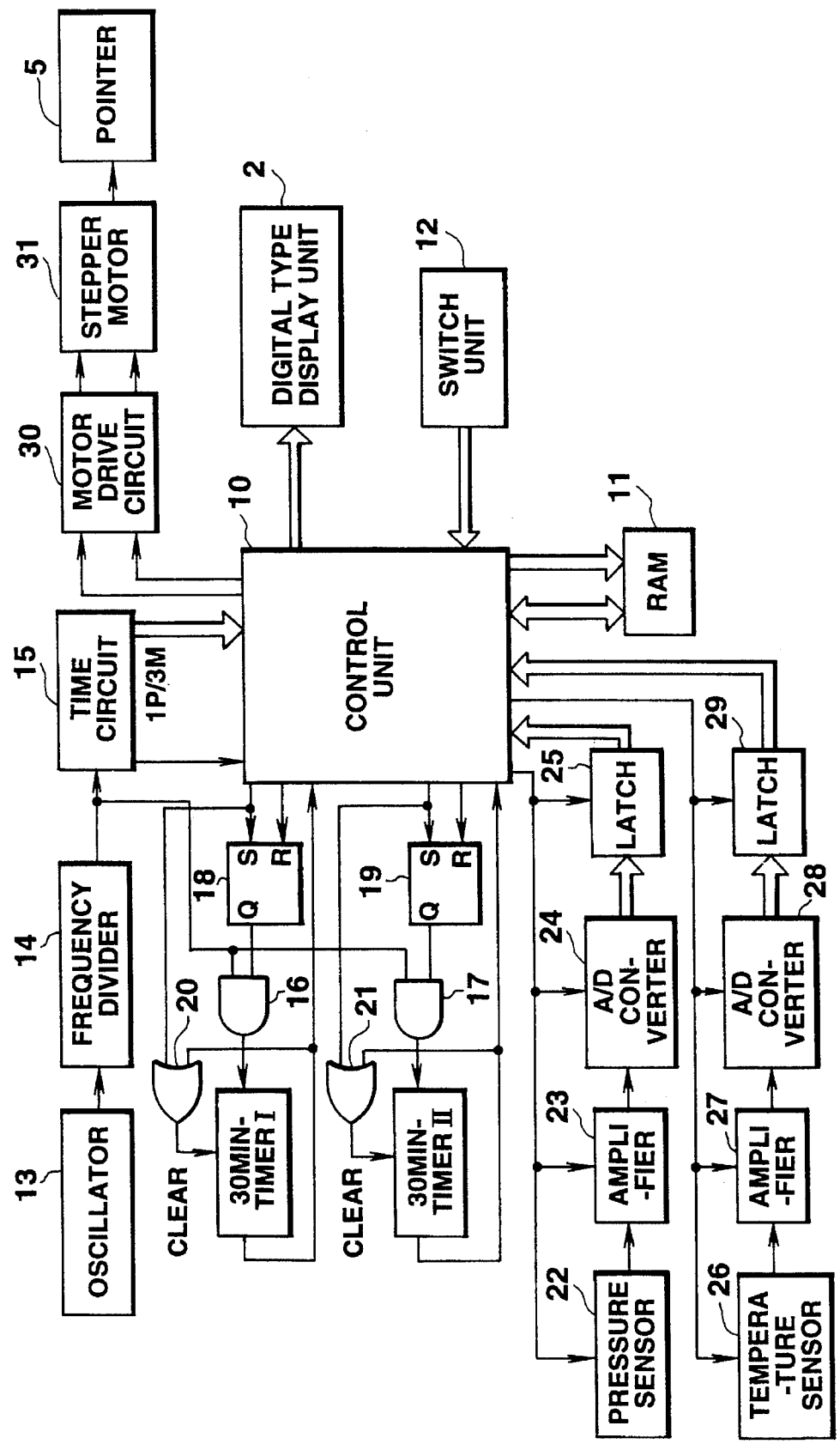
FIG. 3 is a schematic block diagram for indicating a circuit arrangement of the electronic wristwatch shown in FIG. 1.

FIG. 3 is a schematic block circuit diagram for indicating a major portion of the first electronic wristwatch 1. The first electronic wristwatch 1 includes a control unit 10 containing a CPU (central processing unit), a ROM (read-only memory), an input/output port, a clock generator and so on (all components are not shown in detail). A RAM (random access memory) 11 is connected via a bus to this control unit 10.

An output from a switch unit 12 is entered into the control unit 10. An oscillation output from an oscillator circuit 13 is frequency-divided by a frequency dividing circuit 14. An output of this frequency dividing circuit 14 is supplied to a time circuit 15, one input terminal of an AND gate 16, and one input terminal of another AND gate 17. The time circuit 15 counts the output from the frequency dividing circuit 14 to obtain present time data which will be supplied to the control unit 10, and supplies a pulse signal having a 3-minute period (1P/3M) also to this control unit 10.

The control unit 10 furnishes control signals to a set terminal (S) and a reset terminal (R) of each of R-S flip-flop circuit 19. This control signal to this set terminal (S) is supplied to one input terminal of an OR gate 20, or an OR gate 21. Outputs derived from Q terminals of these R-S flip-flop circuit 18 and R-S flip-flop circuit 19 are supplied to the other input terminal of the respective AND gate 16 and AND gate 17. Outputs from these AND gate 16 and AND gate 17 are entered into a 30-minute timer "I" and a 30-minute timer "II", respectively. Outputs derived from these 30-minute timer "I" and 30-minute timer "II" are supplied to the other input terminals of the OR gate 20 and OR gate 21, and also to the control unit 1.

On the other hand, a pressure output of a pressure sensor 22 is amplified by an amplifier 23, and then the amplified analog pressure signal is A/D-converted by an A/D-converting circuit 24 into digital pressure data. This digital pressure data is entered via a latch circuit 25 into the control unit 10. Upon receipt of operation instruction signals derived from the control unit 10, the above-explained pressure sensor 22, amplifier 23, A/D converting circuit 24 and latch circuit 25 commence their operations so that the measured atmospheric pressure data is stored into the latch circuit 25. Also, a temperature output from a temperature sensor 26 is processed by an amplifier 27, an A/D-converting circuit 28, and a latch circuit 29 in a similar manner to the above-described pressure measurement.

The control unit 10 supplies both a normal drive control signal and a reverse drive control signal to a motor drive circuit 30. In response to these control signals, the motor drive circuit 30 furnishes a normal drive signal and a reverse drive signal to a stepper motor 31. Accordingly, a pointer 5 may be moved by this stepper motor 31. It should be noted that this pointer 5 is moved in 200 steps from the lowermost position to the uppermost position.

The control unit 10 outputs a digital display output signal to the digital type display unit 2, so as to drive a liquid crystal display and the like.

REGISTER STRUCTURE OF RAM 11

FIG. 4A schematically represents a structure of a register allocated to a predetermined region of the above-described RAM 11.

A mode register "M" is to store sorts of mode. For instance, when "0" is stored in this mode register M, a selection is made of such a mode (referred to a "measurement mode" hereinafter) indicative of present time, temperatures, altitude, or atmospheric pressure. When "1" is stored in the mode register M, another selection is made of such a trend display mode representative of a trend to variations in atmospheric pressure and temperatures.

A register "N" shown in FIG. 4A is to store an identification code. The identification code identifies whether the pressure display mode or the altitude display mode is selected while the measurement mode is in operative. When "0" is stored in this register N, the atmospheric pressure display mode is selected, whereas when "1" is stored in the register N, the altitude display mode is selected.

A register "L" is such a register for storing identification codes, i.e., atmospheric pressure (code: 0), altitude (code: 1) and temperature (code: 2) while the trend display mode is active. A register "PS" is a register to store atmospheric pressure data measured for every 3 minutes.

A register "HS" is such a register to store altitude data measured for every 3 minutes. A register "TS" is to store therein temperature data measured for every 3 minutes. A register "PK" is a register for storing reference pressure data. A register "PN" is such a register for storing therein difference data between the reference pressure data and the measured pressure data. A register "FP" is to store a flag indicating whether or not the atmospheric pressure is under measurement. When the atmospheric pressure is being measured, a flag of "1" is set. A register "HK" corresponds to a register for storing therein reference altitude data. A register "HN" corresponds to such a register for storing difference data between the reference altitude data and the measured altitude data.

A register "FH" is a register for storing a flag indicating whether or not the altitude measurement is carried out. When the altitude measurement is performed, a flag of 1 is set. A register PZ is to store the number of unit under such a condition that the measurement data about atmospheric pressure, present time, and a temperature which have been measured from the commencement of the pressure measurement until every 30 minutes, are stored into an atmospheric pressure memory PM (will be discussed later), and one set of these atmospheric pressure, present time and temperature measurement data is handled as one unit.

A register "HZ" is such a register for storing the number of unit under such a condition that the measurement data about altitude, present time, and temperature which have been measured from the commencement of the altitude measurement until every 30 minutes, are stored into an altitude memory HM (will be described later), and one set of these altitude, present time, and temperature measurement data is handled as one set. A register "TZ" is such a register for storing the number of unit under such a condition that the measurement data about temperatures and present time which have been measured at every zero time (namely, 00 minute) and every 30 minutes, are stored into a temperature memory TM (will be described later), and one set of these temperatures and present time is handled as one set.

A register "TT" corresponds to a register for storing data about the present position of the pointer 5. Digital values of 0 to 200 correspond to contents of the data. That is, the digital numeral value of 100 corresponds to the indication "0" of the pointer 5, the digital numeral value of 200 corresponds to the indication "+100 (+10)" of this pointer 5, and further the digital numeral value of 0 corresponds to the indication "−100 (−10)" of this pointer 5. A register "NI" is such a register for storing data about a position where the pointer 5 has been moved, and the contents of this data are numeral values of 0 to 200. A register "Q" is to store control data used to designate the memory in the trend display mode.

Furthermore, a register "R" corresponds to a register for temporarily storing work data. A register "J" is such a register for storing data corresponding to a degree indicative of an evaluation basis. This evaluation basis is to judge how long a time period is continued in the trend mode. The numeral values of 1, 2, 4, 8 are cyclically changed by operating the fourth operation switch S4. In this first embodiment, the numeral value of 1 corresponds to 30 minutes, the numeral value of 2 corresponds to 1 hour, the numeral value of 4 corresponds to 2 hours, and the numeral value of 8 corresponds to 4 hours.

FIG. 4B schematically indicates a structure of a data storing memory allocated to a predetermined memory region in the RAM 11. The atmospheric pressure memory "PM" is such a memory to store such data about the atmospheric pressure, the present time, and the temperature, which have been measured for every 30 minutes, and one set of these measured data is handled as one unit. This atmospheric pressure memory PM owns 48 units capable of storing measurement data acquired for 24 hours. The function of the altitude memory HM is similar to that of this atmospheric pressure memory PM, namely stores one unit of the altitude, present time, and temperature measurement data. The temperature memory "TM" is such a memory for storing the temperature and present time data measured for every 30 minutes, in which one set of these temperature and present time data is handled as one set.

OVERALL OPERATION OF FIRST ELECTRONIC WRISTWATCH

Figure 5:
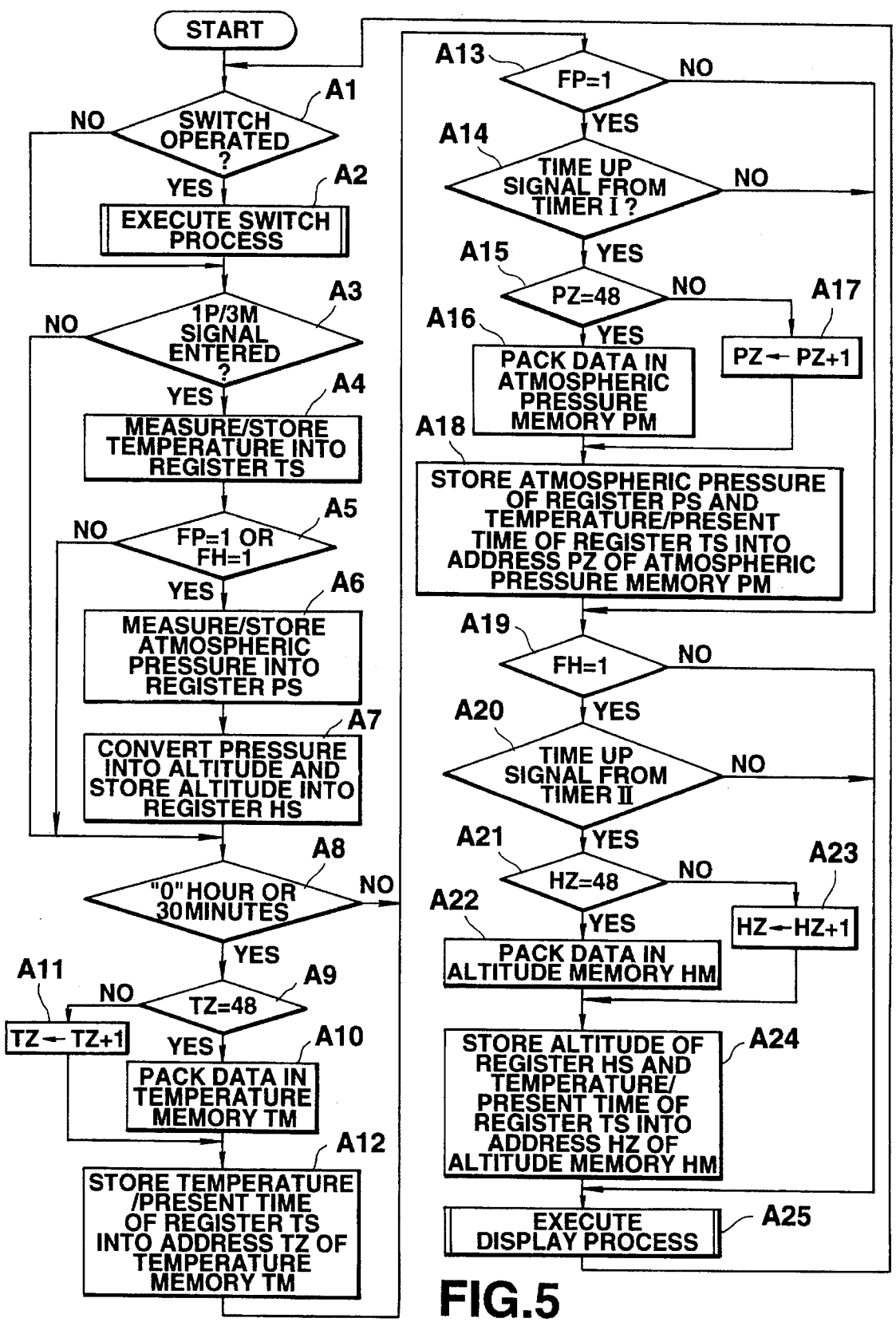
FIG. 5 is a flow chart for explaining a conceptional operation of the electronic wristwatch shown in FIG. 3.

FIG. 5 is a flow chart for explaining overall operation of the first electronic wristwatch of the present invention.

In this flow chart, the CPU (not shown in detail) of the control unit 10 completes an execution of a predetermined initializing routine, and thereafter commences an execution of an entire program as follows:

At a first step A1 of this flow chart, this CPU of the control unit 10 judges whether or not any switch operation of the switch unit 12 is carried out. When the switch operation is carried out, the control process is advanced to the next step A2 at which a predetermined switch process operation is performed. Then, the process control is advanced to a step A3. To the contrary, when no switch operation is carried out, since such a switch process operation is not required, the control process is directly advanced from the step A1 to the step A3. At this step AB, the CPU judges whether or not the pulse signal having 3 minute time period issued from the timer circuit 15 is supplied to the control unit 10.

When such a judgement result is made that this pulse signal is supplied to the control unit 10, the control process is advanced to a step A4. At this step A4, the control unit 10 supplies the operation instruction signal to the temperature sensor 26, the amplifier 27, the A/D-converting circuit 28, and the later circuit 29 in order to measure the temperatures, so that the control unit 10 reads the temperature data stored in the latch circuit 29, and writes this temperature data into the register "TS" shown in FIG. 4A.

Subsequently, a judgement is made whether or not the content of the register FP or the register FH becomes "1".

That is, it is judged whether or not the atmospheric pressure data, or the altitude data is under measurement.

At this step A5, when it is judged that the content of the register FP or the register FH becomes "1", the control process is advanced to the subsequent step A6. At this step A6, the CPU outputs the operation instruction signals to the pressure sensor 22, the amplifier 23, the A/D-converting circuit 24, and the latch circuit 25 to measure the atmospheric pressure, and then reads out the atmospheric pressure data stored in the latch circuit 25 and also writes this pressure data into the register PS. Next, this atmospheric pressure data is converted into the corresponding altitude data (pressure/altitude conversion) at a step A7, and thereafter the converted altitude data is written into the register HS at a step A8.

Conversely, when it is judged at the previous step A3 that no pulse signal is supplied, and furthermore when it is judged at the preceding step A5 that the content of the register FP, or the register FH does not become "1", the control process is advanced directly to a step A8. At this step A8, another check is made as to whether the present time is equal to "zero" hour (namely 00 minute), or to 30 minutes. If the present time is equal neither to "zero" hour, nor to 30 minutes, then the control process is advanced to a step A13. To the contrary, when a judgement result is made at the step A8 that the present time corresponds to either "zero" hour, or 30 minutes, the control process is advanced to a step A9 at which a check is done as to whether or not the content of the register TZ becomes "48". In other words, it is judged whether or not the entire memory regions of the temperature memory TM, namely 48 units of data are filled with the temperature measurement data.

At this step A9, when the CPU judges that the contents of this register TZ become 48, the control process is advanced to a step A11. The content of this register TZ is incremented by 1, and then the control process is advanced to a step A12. When it is judged at the step A9 that the content of the register TZ becomes 48 and the memory regions for 48 units in the temperature memory TM are filled with the temperature measurement data the control process is advanced to a step A10. At this step A10, the oldest (latest) temperature measurement data is discarded, and the remaining temperature measurement data are sequentially moved up to readjust these data. In other words, the temperature measurement data are packed.

Then, the control process is advanced to the step A12. At this step A12, both of the temperature measurement data and the present time data stored in the register TS are written into such a memory which is specified by an address either equal to, or corresponding to the content of the register TZ for the temperature memory TM. Then, the control process is advanced to a further step A13.

At the step A13, a check is done whether or not the content of the register FP becomes "1". That is, it is judged whether or not the data writing instruction is issued to the atmospheric pressure memory PM. When the content of the register FP is not "1", but no data writing instruction is issued, the control process is advanced to a step A19. Conversely, when the content of this register FP is equal to "1", and the data writing instruction is issued, the control process is advanced to a step A14 at which another judgement is made whether or not the time up signal is produced from the 30-minute timer "I". When no time up signal is produced, the control process is advanced to the step A19, whereas when the time up signal is produced, the control process is advanced to the previous steps A15 through A18.

At these steps A15 to A18, a process operation similar to that executed at the steps A9 through A12 is carried out in accordance with the content of the register PZ. That is, the content of the register PS, the content of the register TS, and the present time data are written into the atmospheric pressure memory PM. Namely, the various data about the atmospheric pressure, temperature, and present time are written into the atmospheric pressure memory PM, and then the control process is advanced to the step A19.

At this step A19, a check is done as to whether or not the content of the register FH becomes "1". In other words, a check is made as to whether or not the data write instruction is issued to the altitude memory HM. When the content of the register FH is not "1", but no data writing instruction is issued to this altitude memory, the control process is advanced to a step A25. Conversely, when the content of this register FH is equal to "1", and the data writing instruction is issued, the control process is advanced to a step A20 at which another judgement is made whether or not the time up signal is produced from the 30-minute timer "II". When no time up signal is produced, the control process is advanced to the step A25, whereas when the time up signal is produced, the control process is advanced to the previous steps A21 through A24. At these steps A21 to A24, a process operation similar to that executed at the steps A9 through A12 is carried out in accordance with the content of the register HZ. That is, the content of the register HS, the content of the register TS, and the present time data are written into the altitude memory HM. Namely, the various data about the altitude, temperature, and present time are written into the altitude memory HM, and then the control process is advanced to the step A25. At this step A25, a display process operation (will be discussed later) is carried out, and then the control process is returned to the first step A1 at which the above-explained various process operations are repeatedly performed.

SWITCH PROCESS OPERATION

Figure 6:
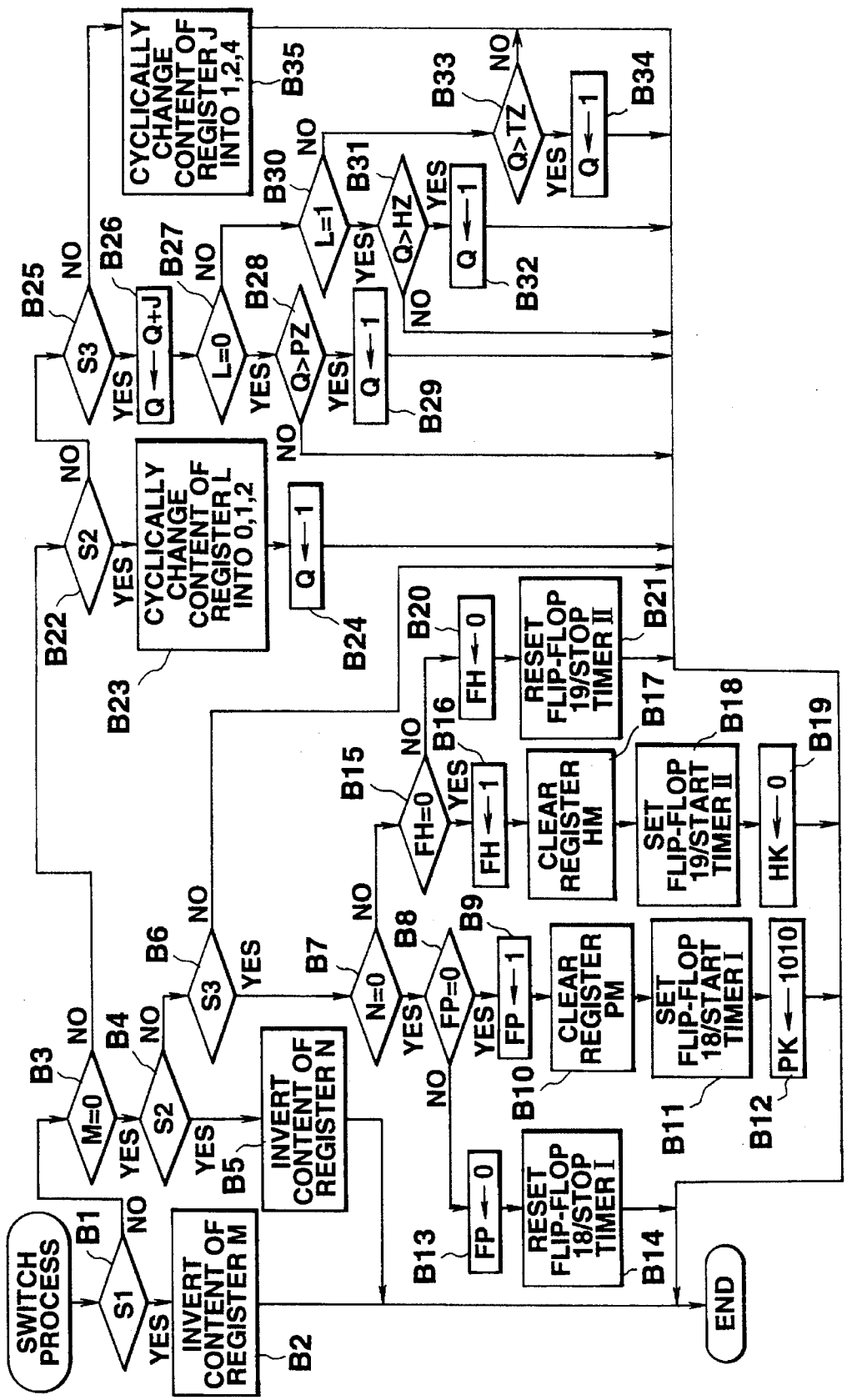
FIG. 6 is a flow chart for explaining a detailed operation of the switch process shown in FIG. 5.

FIG. 6 is another flow chart for explaining in detail the switch process operation executed at the step A2. In this detailed flow operation, a check is done as to whether or not the first switch S1 is operated at a first step B1. That is, a judgement is done as to whether or not the mode selecting switch S1 is operated. When the mode selecting switches S1 is manipulated, the control process is advanced to a step B2 at which the content of the register M is inverted and this switch operation is accomplished. In other words, the measurement mode and the trend display mode are alternately in operative every time the mode selecting switch S1 is manipulated.

To the contrary, if the mode selecting switch S1 is not operated, then the control process is advanced to a step B3 at which a check is done whether or not the content of the register M becomes "0". When the content of the register M become "0" and the measurement mode is selected, the process operation is advanced to a step B4. At this step S2, a judgement is made as to whether or not the second switch S2 is operated, namely a selection is made between the atmospheric pressure display mode and the altitude display mode. When the second switch S2 is manipulated, the control process is advanced to a step B5. At this step B5, the content of the register N is inverted. That is, since the second switch S2 is operated in the measurement mode to request a mode change to either the atmospheric pressure display mode, or the altitude display mode, the content of this register N is inverted so as to accept this request. Then, the switch process operation is complete.

When this second switch S2 is not operated, the control process is advanced to a step S6 at which another judgement is made as to whether or not the third switch S3 is operated. Namely, a judgement is done as to whether or not as instruction to commence either the atmospheric pressure measurement, or the altitude measurement is produced. If the third switch S3 is not manipulated, then the control process is advanced to a step B7 at which a check is done as to whether or not the content of the register N becomes "0". In other words, it is so judged that either the atmospheric pressure display mode is selected, or the altitude display mode is selected. When the content of the register N is "0" and the atmospheric pressure display mode is selected, the control process is advanced to a step B8 at which a check is done as to whether or not the content of the register FP becomes "0", namely a check is made as to whether or not the atmospheric pressure is under measurement. When the content of the register FP becomes "0" and the atmospheric pressure is not under measurement, the control process is advanced to a step B9 at which "1" is written into the register FP to commence the atmospheric pressure measurement. Next, the content of the atmospheric pressure memory PM is cleared, the R-S flip-flop circuit 18 is set at a step B11 and also the 30-minute timer "T" is started. Thereafter, data on 1,010 hps is set as the reference atmospheric pressure data is set to the register PK at a step B12, and the switch process operation is ended.

To the contrary, when the content of the register FP is not equal to "0" at the previous step B8, this implies such a case that the data storage operation to the atmospheric pressure memory PM is accomplished and the pressure measurement is ended. As a consequence, the content of the register FP is returned to "0" (step B13), the R-S flip-flop circuit 18 is reset, and the 30-minute timer "T" is stopped (step B14).

When the content of the register N is not equal to "0" at the previous step B7, the altitude display mode is selected. In this display mode, the register FH, the altitude memory HM, the R-S flip-flop circuit 19, and the 30-minute timer "II" are controlled at the steps B15, B16, B18, B19, B20 and B21 by performing a process operation similar to that executed in the steps B8 through B14. It should be noted that 0 m (zero meter) is set as the reference altitude data to the register HK at the step B19.

When the content of the register M is not equal to "0" at the step B3, this implies that the trend display mode is selected. In this trend display mode, a check is done as to whether or not the second switch S2 is operated at a step B22. If the second switch S2 is operated, then the control operation is advanced to a step B23 at which the content of the register L is changed. This changing operation of the register L is carried out in such a manner that "0", "1", and "2" are cyclically repeated as the content of this register every time this second switch S2 is operated. That is, the selections of the atmospheric pressure display, the altitude display, and the temperature display are set. Subsequently, the control process is advanced to a step B24 at which "1" is set to the register Q to accomplish the switching operation.

On the other hand, when the second switch S2 is not operated at the step B22, the control operation is advanced to a step B25 at which a check is done as to whether or not the third switch S3 is operated. If this third switch S3 is not operated at the step B25, it is so judged that the fourth switch S4 is manipulated, and thus the control process is advanced to a step B25. At this step B35, the content of the register J is changed in such a manner that "1", "2", "4", and "8" are cyclically repeated every time the switch S4 is manipulated. That is, the time period functioning as the trend evaluation base is selected, and then this switch process operation is accomplished.

When such a judgement result is made at the step B25 that the third operation switch S3 is manipulated, the control process is advanced to a step B28 at which the content of the register J is added to the content of the register Q, and then the summed data is set to the register Q. That is, the content of the register Q is adjusted in order that the various data corresponding to a desirable time period during which trends for variations contained in these data are wanted to be grasped, can be derived from the atmospheric pressure memory PM, the altitude memory HM, and the temperature memory TM. It should be noted that this contact of the register Q becomes the pointer.

Subsequently, the control process is advanced to a step B27 at which a judgement is performed as to whether or not the content of the register L is "0". If this content is "0", then the atmosphere-pressure trend display mode is selected. The control process is advanced to a step B28 at which a judgement is made as to whether or not the content of the register Q becomes greater than the content of the register PZ. That is, a check is carried out as to whether or not the numeral value of the pointer exceeds the unit quantity of the data stored in the atmospheric pressure memory PM. When the content of the register Q exceeds the unit quantity of the data stored in the atmospheric pressure memory PM, the control process is advanced to a step B29 at which the content of the register Q is again set to "1", and thereafter the third switch process operation is complete. In other conditions, this third switch process operation is directly ended.

On the other hand, when the content of the register L is not equal to "0" at the previous step B27, a check is done as to whether or not the content of the register L is "1". When the content of this register L corresponds to "1", this condition implies that the altitude trend display mode is selected, in which a process operation similar to that of the step B28 and the step B29 is carried out at a step B31 and a step B32. It should be understood that the comparison process effected at the step B31 is carried out with employment of the content of the register Q and the content of the register HZ.

To the contrary, when the content of the register L is not equal to "1" at the previous step B30, this content is equal to "2" which implies that the temperature trend display mode is selected, in which a process operation similar to that of the step B28 and the step B29 is carried out at a step B33 and a step B34. It should be noted that the comparison operation executed at the step B33 is carried out by using the content of the register Q and the content of the register TZ.

DISPLAY PROCESS OPERATION

Figure 7:
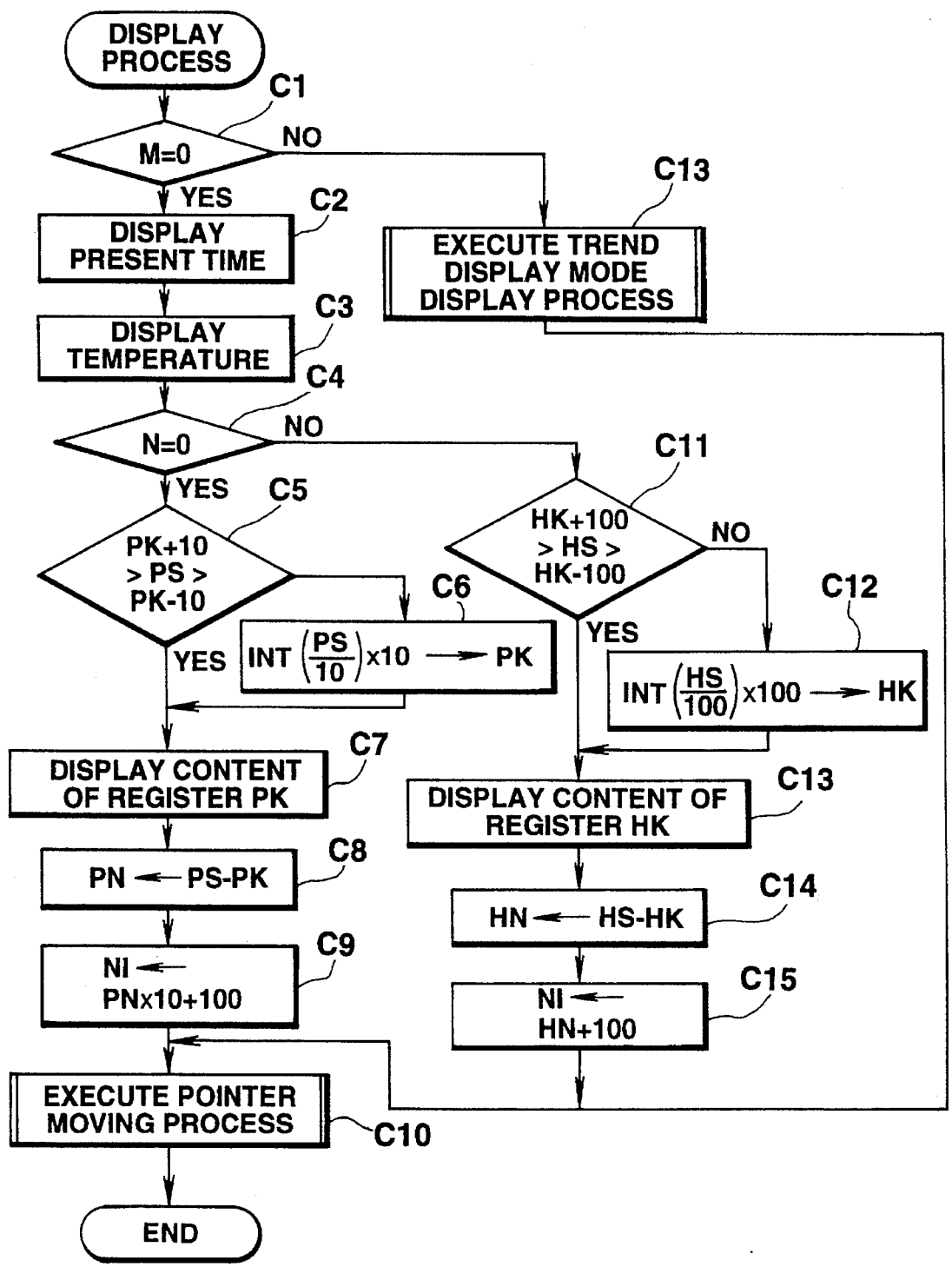
FIG. 7 is a flow chart for explaining in detail the display process shown in FIG. 5.

FIG. 7 is a flow chart for representing in detail the display process operation executed at the step A25 of FIG. 5. In this flow chart, a judgement is performed as to whether the atmospheric pressure display mode or the altitude display mode is selected. When the content of the register N is "0" and the atmospheric pressure display mode is selected, the control process is advanced to a step C5. At this step C5, a check is done as to whether or not the numeral value of the measured atmospheric pressure data stored in the register PS is equal to the numeral value within such a range between plus 10, and minus 10 with respect to the numeral value of the reference atmospheric pressure data stored in the register PK. If the numeral value of the measured atmospheric pressure data satisfies the above-identified condition, then the control process is advanced directly to a step C7 at which the numeral value of this reference atmospheric pressure data is displayed on the second-staged display unit 2b.

When it is so judged at the step C5 that the numeral value of the measured atmospheric pressure data cannot satisfy this condition, the control process is advanced to a step C8. At this step C8, the numeral value of the reference atmospheric pressure data stored in the register PK is changed into such a value. Namely, the numeral value of the measured atmospheric pressure data stored in the register PS is divided by 10 to obtain a pressure value, and an integer portion of this pressure value is employed as the above-described "changed" reference atmospheric pressure value. Then, the control process is advanced to a further step C7 at which this "changed" reference atmospheric pressure value is displayed.

Next, the control process is advanced to a step C8 at which data about a difference between the numeral value of the measured atmospheric pressure data and the numeral value of the reference atmospheric pressure data is set to the register PN. Subsequently, the control process is advanced to a step C9 at which data about such a value obtained by multiplying the numeral value of the difference data stored in the register PN by 10 and by adding 100 to the multiplied numeral value, is set to the register NI. That is, the data about the position to which the pointer 5 should be moved is set to the register NI. Thereafter, the control process is advanced to a step C10 at which the moving process operation of this pointer 5 is performed and the display process operation is accomplished.

On the other hand, when a judgement result is made at the step C4 that the altitude display mode is selected, a predetermined process operation is executed at steps C11, C12, C13, C14 and C15 based on the content of the register HS and the content of the register HK in a manner similar to that executed at the step C5 through the step C9. Accordingly, the data are set to the register HN and the register NI, so that the process operation for the altitude display mode is carried out.

When another judgement result is made at the step C1 that the trend display mode is selected, the process operation for the trend display mode as defined at the step C13 is carried out, and then is completed. This process operation for the trend display mode will be described in detail.

POINTER MOVING PROCESS OPERATION

Figure 8:
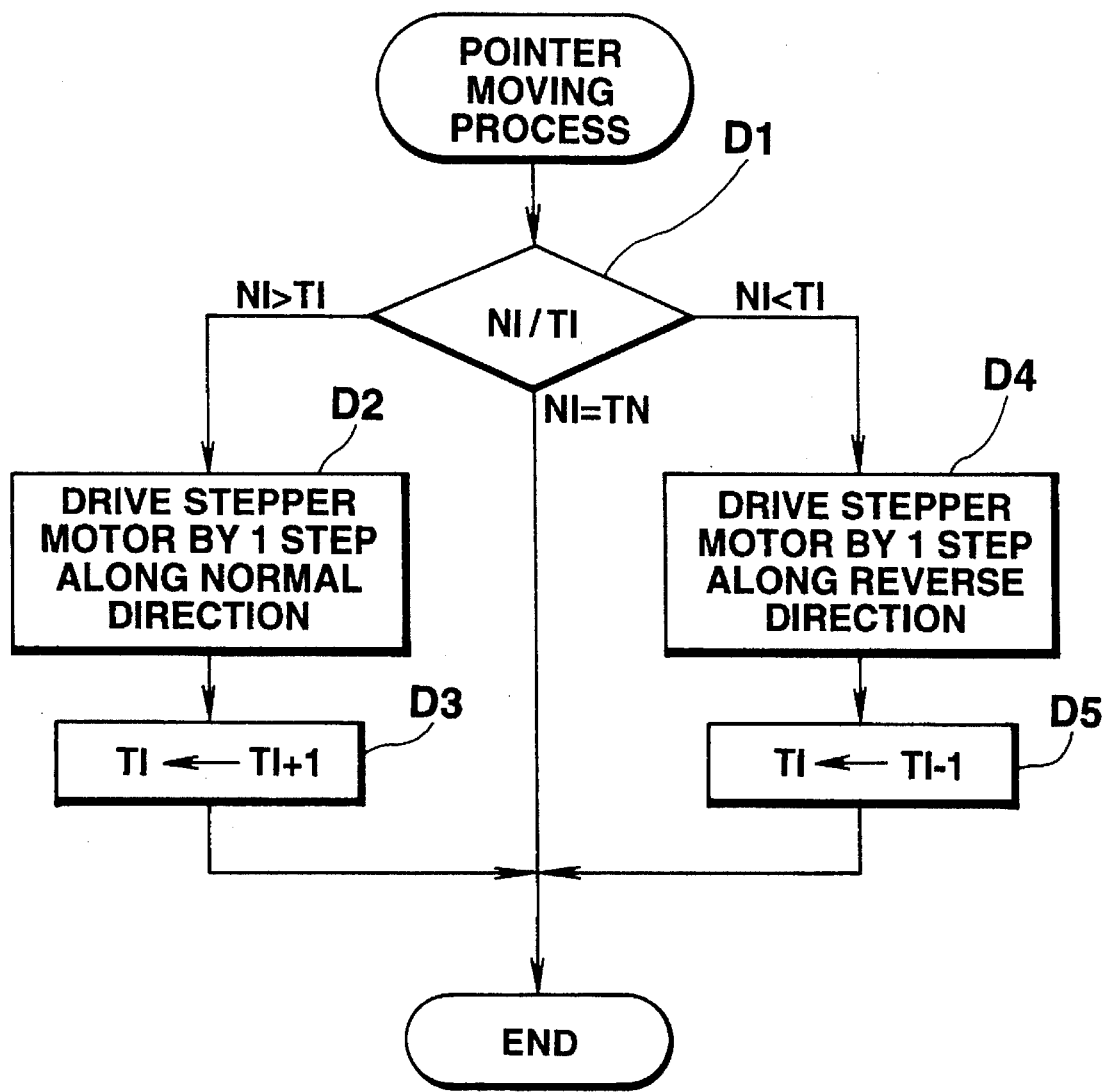
FIG. 8 is a flow chart for explaining a detailed operation of the pointer moving process shown in FIG. 7.

In FIG. 8, there is shown a flow chart for explaining in detail the moving process operation for the pointer 5 performed at the step C10 shown in FIG. 7.

At a first step D1 of this flow chart, a comparison is done between the data about the present position of the pointer 5 (i.e., content of register TI) and the data about the position to which the pointer 5 is to be moved (i.e., content of the register NI).

When the first-mentioned positional data is equal to the second-mentioned positional data, the pointer moving process is completed.

When such a judgement result is made that the data about the position to which this pointer 5 is to be moved is greater than the data about the present position of this pointer 5, the control process is advanced to a step D2 at which the stepper motor 31 is driven by 1 step along the normal drive direction. Subsequently, the control process is advanced to a step D3 at which the content of the register TI is updated by adding 1 to the present positional data of the pointer 5, and thereafter the pointer moving process operation is ended.

On the other hand, conversely when it is so judged that the data about the position to which the pointer 5 is to moved is smaller than the data about the present position of this pointer 5, the control process is advanced to a step D4. At this step D4, the stepper motor 31 is driven by 1 step along the reverse direction. Next, the control process is advanced to a step D5 at which the content of the register TI is updated by subtracting 1 from the positional data of the pointer 5, and this pointer moving process operation is ended.

TREND DISPLAY MODE

Figure 9:
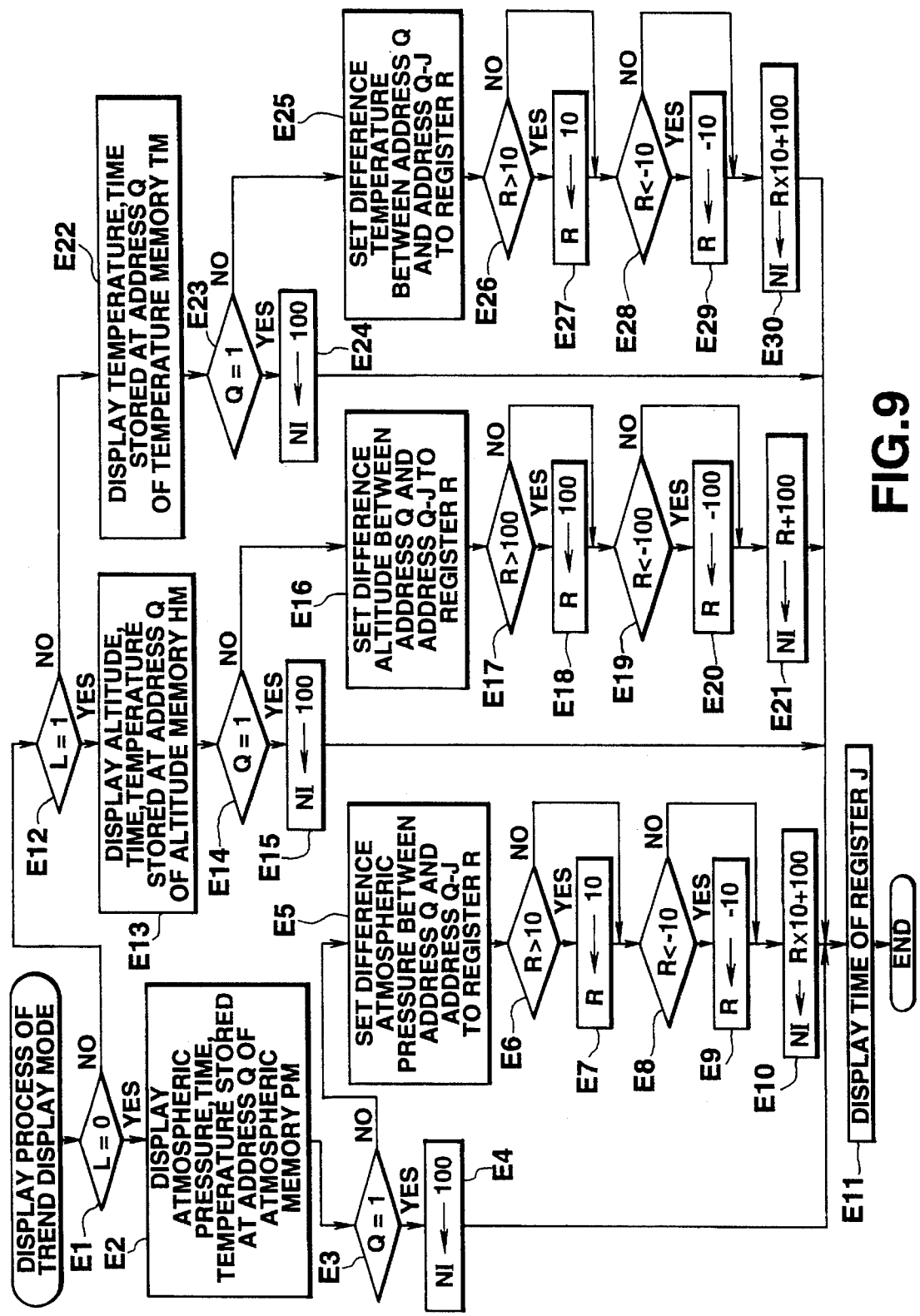
FIG. 9 is a flow chart for describing a detailed operation of the trend display mode process indicating in FIG. 7.

FIG. 9 is a flow chart for representing a detailed process operation of the trend display mode executed in the above-described step C13 of FIG. 7.

At a first step E1 of this flow chart, a judgement is made as to whether or not a selection is made of the trend display for atmospheric pressure variations (namely, the content of the register L becomes "0" or not). Then, the process operation is advanced to the next step E2. At this step E2, the address of the atmospheric pressure memory PM is designated based upon the content of this register Q, the various data about the atmospheric pressure, time and temperature are read out from the atmospheric pressure memory PM, and then these data are displayed on the digital type display unit 2 in accordance with the read data.

Thereafter, a check is made at a step E3 as to whether or not the content of the register Q is 1, namely the content of the register Q corresponds to the first data. In case of the first data, the process operation is advanced to a step E4, at which the content of the register NI is set to such data (100) that the pointer 5 points out the above-explained zero index 4. Then, the process operation is advanced to a step E11.

On the other hand, when the content of the register Q is not equal to "1" at the previous step E3, the process operation is advanced to a step E5. At this step E5, such difference data about the atmospheric pressure data is set into the register R. This difference data is obtained between the atmospheric pressure data read out from the memory at the address designated based on the content of the register Q, and the atmospheric data read out from the memory at the address designated based on the value calculated by subtracting the content of the register J from the content of the register Q within the atmospheric pressure memory PM. It should be understood that the above-explained operation executed at this step E5 is simply indicated by "R←{(atmospheric pressure of address 0)—(atmospheric pressure of addresses Q–J)}".

At the subsequent step E6, a check is done as to whether or not the content of the register R is greater than 10. When the content of the register R is not greater than 10, the process operation jumps to a further step E8. Conversely, when the content of the register R is greater than 10, the process operation is advanced to the next step E7, at which "10" is set to the register R. At the step E8, a judgement is made as to whether or not the content of the register R is smaller than −10. When the content of the register R is not smaller than −10, the process operation jumps to a step E10. Conversely, when the content of this register R is smaller than −10, the process operation is advanced to a step E9. At this step E9, "−10" is set to the register R, and then the operation process is to a step E10.

The process operation defined from the step E6 to the step E9 is to avoid such a condition that the pointer 5 points out its value beyond both end portions of the scale. At the step E10, a calculation is performed that the content of the register R is multiplied by 10 and the multiplied value is added to 100. Then, the calculated value is set to the register NI. Subsequently, the process operation is advanced to a step E11, at which the time (time period) corresponding to the content of the register J is displayed on the four-staged display portion 2d of the digital type display unit 2, so that the display process of the trend display mode is complete.

On the other hand, when no selection is made of the atmospheric pressure trend display at the step El, a judgement is done at a step E12 as to whether a selection is made of the altitude trend display (namely, the content of the register L is "1"), or the temperature trend display (namely, the content of the register L is not "1").

When the content of this register L corresponds to "1", namely the altitude trend display process is selected a similar process operation to that defined from the step E3 to step E10 is carried out at steps through E21. It should be understood that since the scale is designated by +100 and −100 in case of the altitude trend display, a suitable process operation thereto is carried out.

When the content of this register is 2, namely the temperature trend display process is selected, a similar process operation to that defined at the steps E2 to E10 is performed at steps E22 to E30.

OVERALL OPERATION UNDER USE OF ELECTRONIC WRISTWATCH

Operations under use of the electronic wristwatch according to the first embodiment in one selected operation mode will now be briefly explained. The temperature measurement is carried out at 3-minute interval while the electronic wristwatch is operated. Then, normally, both the temperature data and the present time data are represented on the digital type display unit 2 in the measurement mode (M=0). When the present time becomes 0:00 hour and 30 minutes, the temperature data measured at these measurement time instants are stored into the temperature memory TM together with the present time data.

When the measurement for atmospheric pressure is commenced, the second switch S2 is manipulated to change the presently selected temperature measurement mode into the atmospheric pressure display mode (N=0). Then, the third switch S3 is operated to set the content of the register FP to 1 and also to set the R-S flip-flop circuit 18, so that the operation of the timer I is started. When the atmospheric pressure measurement is commenced, the atmospheric pressure is measured at 3-minute interval, so that the numeral value larger than, or equal to 10 hpa within the measured atmospheric pressure data is displayed on the digital type display unit 2, and the numeral value smaller than 10 hpa is displayed on the pointer type display unit 3.

A display example about atmospheric pressure will now be explained. Assuming now that the measured atmospheric pressure PS is 994 hpa, as shown in FIG. 1, the numeral value "990" is displayed on the second display portion 2b of the digital type display unit 2, the pointer 5 of the pointer type display unit 3 is moved to the position "+4", and the value "+4 hpa" is represented by the pointer 5.

Under such a condition, when the measured atmospheric pressure PS is in the range of (990−10) hpa <PS<(900+10) hpa, the numeral value designated by the pointer 5 of the pointer type display unit 3 is merely changed while the numeral value of "990" is represented on the second display portion 2b of the digital type display unit 2.

For example, when the measured atmospheric pressure becomes 998 hpa, the numeral value of "+8" is displayed by way of the pointer 5 of the pointer type display unit 3 while the numeral value of "990" is represented at the display unit 2b of the digital type display unit 2.

On the other hand, when the measured atmospheric pressure PS becomes smaller than 990 hpa, e.g., 986 hpa, the below-mentioned display operations by the pointer 5 are carried out, while displaying the numeral value of 990 on the second display portion 2b of the digital type display unit 2. That is, the pointer 5 of the pointer type display unit 3 is moved downward from the central position up to the fourth scale along the down direction, namely the position of −4. Accordingly, this display condition implies that the measured atmospheric pressure PS becomes "990−4=986 hpa".

When the measured atmospheric pressure is increased from 994 hpa shown in FIG. 1 to higher than 1,000 hpa, for instance, 1,003 hpa, the numeral value of "1,000" is displayed at the second display portion 2b of the digital type display unit 2, and furthermore the numeral value of "+3" is displayed by the pointer 5 of the pointer type display unit 3.

Then, when the measured atmospheric pressure is changed from 994 hpa to lower than 980 hpa, e.g., 977 hpa, the numeral value of "970" is displayed by the digital display unit 2 and also the numeral value of "+7" is displayed by the pointer 5.

The atmospheric pressure data measured at every 30 minutes from the commencement of the atmospheric pressure measurement are sequentially stored into the atmospheric pressure memory in combination with the temperature data and the present time data.

In case that the altitude measurement is commenced, the second switch S2 is operated to switch the present display mode to the altitude display mode (N=1), and then the third switch S3 is operated to set the content of the register FP to "1", and to set the R-S flip-flop circuit 19. As a result, the operation of the timer II is started. When the altitude measurement is commenced, the altitude data are acquired at 3-minute interval, so that the numeral values among the measured altitude data higher than, or equal to 100 meters are displayed on the digital type display unit 2, and the numeral values smaller than 100 meters are displayed on the pointer type display unit 3. The altitude data which have been measured at every 30 minutes since the altitude measurement is commenced, are sequentially stored in the altitude memory HM in combination with the temperature data and the present time data.

When either the altitude measurement or the atmospheric pressure measurement is accomplished, the third switch S3 is operated in the relevant display mode, whereby the content of either the register FP or the register FH is set to "0", and furthermore either the R-S flip-flop circuit 18, or the R-S flip-flop circuit 19 is reset to stop the operation of the timer I or the timer II.

Thereafter, when a new trend in altitude, atmospheric pressure, or temperatures is desirably acquired, the third switch S3 is manipulated to change the present display mode into the trend display mode (M =1). When the trend display mode is in operative, the second switch S2 is manipulated to select the desired trend display mode with respect to the atmospheric pressure data, the altitude data and the temperature. Then, the fourth switch S4 is operated to select the desirable interval for comparing the acquired data, i.e., 30 minutes (J=1), 1 hour (J=2), 2 hours (J=4), and 4 hours (J=8).

When for instance, the atmospheric display mode is selected as the trend display mode and the interval of 30 minutes is selected by operating the fourth switch S4, the addresses of the atmospheric pressure memory PM are sequentially designated every time the third switch S3 is operated. As a result, the data (i.e., atmospheric pressure, temperature, and time instant data) designated by this designated address of the atmospheric pressure memory PM are read out to be displayed on the digital type display unit 2. Furthermore, the difference between the atmospheric pressure data stored at this designated address and the atmospheric pressure data measured before 30 minutes, namely the pressure data stored at the preceding address by 1, is displayed on the pointer type display unit 3.

When the 1-hour measuring interval is selected by operating the switch S4, the address of the atmospheric pressure memory PM is successively designated for every three addresses (namely, addresses of 1, 3, 5, . . . ) every time the third switch S3 is operated. The data stored at the designated address is stored on the digital type display unit 2, and also the difference between the atmospheric pressure data stored at the designated address and the atmospheric pressure data acquired before 1 hour, namely the atmospheric pressure stored at the address preceding the present address by 2, is displayed on the pointer type display unit 3.

Similarly, when the fourth switch S4 is operated to select either the 2-hour measuring interval, or the 8-hour measuring interval, the addresses of the atmospheric pressure memory PM are designated for every five addresses, or every nine addresses every time the third switch S3 is manipulated. Accordingly, the data stored at the designated address is displayed on the digital type display unit 2, and also the difference between the atmospheric pressure data stored at this designated address and the atmospheric pressure data stored at the previously designated address by 4 or 8 is displayed on the pointer type display unit 3.

As previously described in detail, in accordance with the first embodiment, the numeral values of the measured atmospheric pressure data (or altitude data) higher than, or equal to 10 hpa (100 m) are displayed as the reference data on the digital type display unit 2, and furthermore the difference between the measured data and this reference data, namely the numeral values lower than 10 hpa (100 m) is displayed on the pointer type display unit 3. As a consequence, not only operators can directly read the approximate values, but also can recognize very small changes in the measured data.

Moreover, since the differences in the measurement data acquired at a preselected time interval and stored in the relevant memory are displayed by way of a pointer, the changing direction of the data can be clearly recognized. Also, since the display interval of the difference data may be properly selected, there in another merit: That is, when only a small change appears within a short display time interval and therefore the changing direction is not clearly represented, the longer display time intervals are properly selected, so that the changing amount would become large.

SECOND ELECTRONIC WRISTWATCH

Figure 10:
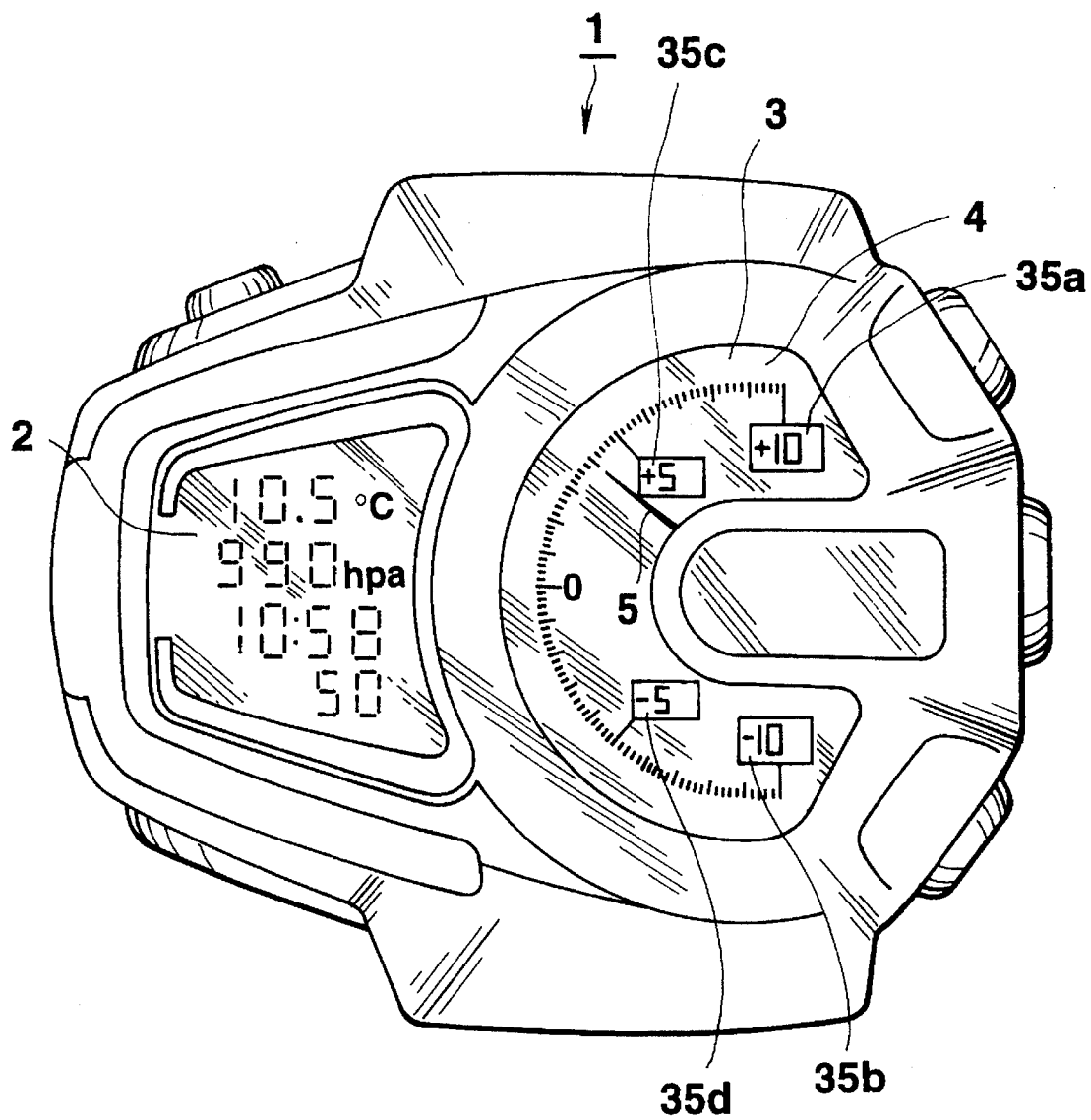
FIG. 10 schematically represents an outer appearance of another electronic wristwatch equipped with a sensor, according to another preferred embodiment of the present invention.

Referring now to FIG. 10, an electronic wristwatch according to a second embodiment of the present invention will be described.

In this second electronic wristwatch, only one-column scale is printed on the name plate 4 of the pointer display unit 3, and the numeral value "0" is printed at the center of this one-column scale. Liquid crystal display (LCD) units 35a, 35b, 35c, 35d are provided at the uppermost scale (right side) position, the lowermost scale (right side) position, the intermediate scale position between this uppermost scale position and "0" position, and the intermediate scale position between this lowermost scale position and "0" position, respectively.

These four LCD units 35a, 35b, 35c, 35d represent the numeral values about the uppermost scale data, the lowermost scale data, and the two intermediate scale data, respectively. That is, when altitude data is displayed, the first LCD unit 35a displays "+100", the second LCD unit 35b indicates "−100", the third LCD unit 35c shows "+50", and the fourth LCD unit represents "−50". When atmospheric pressure data and temperature data are displayed, the first LCD unit 35a indicates "+10", the second LCD unit 35b shows "−10", the third LCD unit 35c denotes "+5", and the fourth LCD unit 35d represents "−5".

THIRD ELECTRONIC WRISTWATCH

Figure 11:
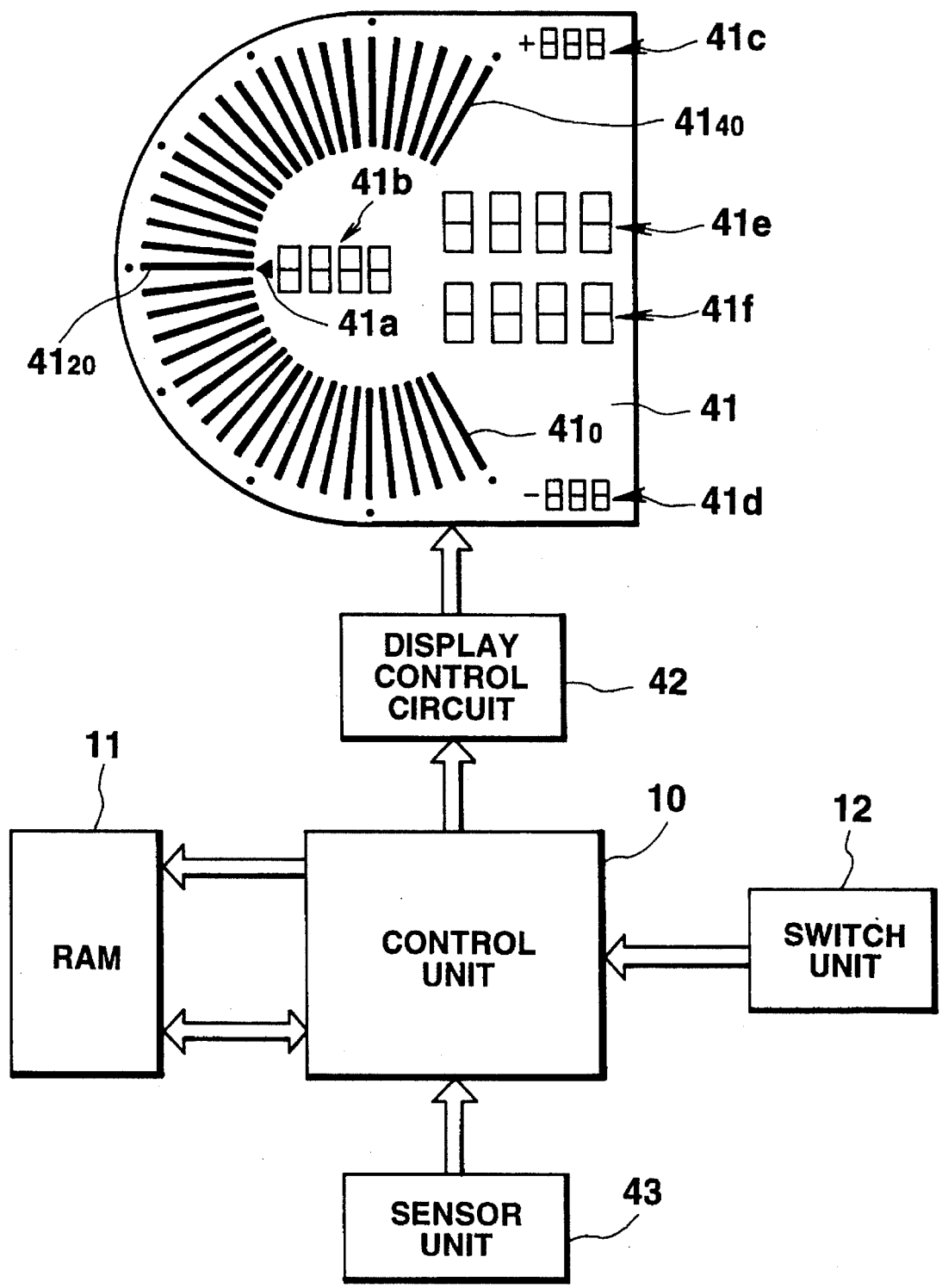
FIG. 11 schematically illustrates an arrangement of an electronic appliance equipped with a sensor, according to a further preferred embodiment of the present invention.

FIG. 11 schematically indicates an electronic wristwatch according to a third embodiment of the present invention. The major feature of this third electronic wristwatch is such that an "electronic type pointer" is employed in an analog type display unit by substituting the above-described "mechanical pointer" by, for instance, a liquid crystal display.

That is, as illustrated in FIG. 11, 42 pointer display members $41_0$ to $41_{40}$ are arranged within a range of 240 degrees in a radial form on the LCD unit 41. A reference position mark 41a is printed near the central pointer display member $41_{20}$, and a reference data digital display member 41b capable of displaying the reference data is provided at a right side with respect to this central pointer display member $41_{20}$. Furthermore, scale display members 41c and 41d are provided at the upper right side with respect to the uppermost pointer display member $41_{40}$, and at the lower right side with respect to the lowermost pointer display member 410, respectively.

These scale display members 41c and 41d display a difference between the value displayed on the uppermost pointer display member $41_{40}$ and the value displayed on the central pointer display member $41_{20}$, and another difference between the value displayed on the lowermost pointer display member $41_0$ and the central pointer display member $41_{20}$, respectively. That is, when altitude data is displayed, the scale display member 41c represents "+100" and the scale display member 41d represents "−100". When either atmospheric pressure data, or temperature data is displayed, the scale display member 41c represents "+10" and the scale display member 41d represents "−10".

Further, two stages of digital display units 41e and 41f are employed to display the altitude data, atmospheric pressure data, temperature data and time data at the right side of the LCD unit 41.

An electronic circuit arrangement of the third electronic wristwatch will now be explained with reference to FIG. 11.

A sensor unit 43 contains a pressure sensor and a temperature sensor. Altitude data, atmospheric pressure data, and temperature data are produced from the detection outputs (measurement data) of these pressure sensor and temperature sensor, and then supplied to a control unit 10.

The control unit 10 calculates both reference data and difference data based upon the measurement data supplied from the sensor unit 43. This control unit 10 supplies these reference data and difference data to a display control circuit 42 together with a scale display member drive signal properly selected by a switch unit 2 in accordance with the designated mode.

Upon receipt of the reference data, the difference data and the scale display member drive signal, the display control unit 42 causes the reference data digital display unit 41b to display the reference data thereon, and turns ON one of 41 pointer display members $41_0$ to $41_{40}$ in response to the difference data, thereby displaying the content of this difference data.

The display control circuit 42 causes the scale display members 41c and 41d to display the numeral values corresponding to the sort of the measurement data to be displayed in response to the scale display drive signal.

That is, when altitude data is displayed, one scale display member 41c displays "+100" and the other scale display member 41d indicates "−100". When atmospheric pressure data and the temperature data are displayed, one scale display member 41c indicates "+10" and the other display member 41d represents "−10".

It should be easily understood to those skilled in the art that although the electronic appliances equipped with the sensors capable of displaying the altitude, atmospheric pressure, and temperatures have been described in the above-explained embodiments, the present invention may also be applied to other electronic appliances equipped with sensors capable of displaying water depths, gas concentration, and other physical values.

What is claimed is:

1. An electronic appliance equipped with a sensor for successively outputting sensor data, the appliance comprising:

converting means for converting sensor data output from the sensor to obtain measurement data having a plurality of digits;

electronic/optical digital display means for digitally displaying upper digit data including upper digits of the plurality of digits of the measurement data obtained by said converting means;

pointer type display means having a movable pointer, for displaying with the movable pointer lower digit data including lower digits of the measurement data obtained by said converting means except for the upper digits included in the upper digit data displayed on said electronic/optical digital display means;

memory means for storing a large number of measurement data which are obtained by said converting means at a preselected time interval;

difference calculating means for calculating a difference between two measurement data among said large number of measurement data stored in said memory means; and display control means for controlling said pointer type display means so as to display the difference calculated by said difference calculating means with the movable pointer.

2. An electronic appliance equipped with a sensor as defined by claim 1, wherein:

said electronic/optical digital display means includes display control means for adding 1 to the least significant digit of said upper digit data to obtain added data, and for digitally displaying said added data; and said pointer type display means includes display control means for displaying complement data on said lower digit data with said movable pointer.

3. An electronic appliance equipped with a sensor as defined by claim 1, wherein:

said movable pointer of said pointer type display means is rotatably provided within a predetermined rotation angle; and said electronic/optical digital display means displays said upper digit data at a substantially central portion within a rotatable range defined by said predetermined rotation angle.

4. An electronic appliance equipped with a sensor as defined by claim 1, wherein:

said pointer type display means includes electronic/optical scale display means for digitally displaying a value of data pointed out by said movable pointer when said pointer is located at a specific position corresponding to a position where said movable pointer is movable.

5. An electronic appliance equipped with a sensor as defined by claim 1, wherein:

said converting means produces a plurality of types of measurement data having a plurality of digits based on the sensor data output from said sensor, said plurality types of measurement data being represented in different units respectively; and said electronic appliance further comprises selectively designating means for designating one of said plural sorts of measurement data, whereby said upper digit data among the measurement data designated by said selectively designating means is digitally displayed by said electronic/optical digital display means, and said lower digit data among the measurement data designated by said selectively designating means is displayed by said pointer type display means.

6. An electronic appliance equipped with a sensor as defined by claim 1, further comprising:

at least a second sensor for measuring a different subject from that to be measured by said sensor, and for outputting second sensor data; and selectively designating means for selectively designating one of said sensor and said second sensor, and wherein said converting means converts sensor data output from said sensor and sensor data output from said second sensor to obtain measurement data each including a plurality of digits, and said electronic/optical digital display means digitally displays said upper digit data among the measurement data of the sensor designated by said selectively designating means, and said pointer type display means displays said lower digit data among the measurement data of the sensor designated by said selectively designating means.

7. An electronic appliance equipped with a sensor as defined by claim 1, further comprising:

time interval designating means for designating a second time interval; and second calculating means for calculating difference data between first and second measurement data among the plurality of measurement data stored in said memory means, said first and second measurement data being obtained substantially every second time interval designated by said time interval designating means; and wherein said pointer type display means includes display control means for displaying said difference data calculated by said second calculating means with said movable pointer.

8. An electronic appliance equipped with a sensor as defined by claim 1, further comprising:

time counting means for counting a present time; and time display means for displaying the present time counted by said time counting means.

9. An electronic appliance equipped with a sensor as defined by claim 1, further comprising:

a case for containing said electronic appliance, and wherein said case includes a strap for attaching said case to an operator.

10. An electronic appliance equipped with a sensor for outputting sensor data, said appliance comprising:

converting means for converting sensor data output from the sensor to obtain measurement data having a plurality of digits;

electronic/optical digital display means for digitally displaying upper digit data including upper digits of the plurality of digits of the measurement data obtained by said converting means, a least significant digit of which upper digits is added with 1;

pointer type display means having a movable pointer for displaying complement data of lower digit data including lower digits of the plurality of digits of the measurement data obtained by said converting means except for the upper digits included in the upper digit data displayed on said electronic/optical display means;

memory means for storing a plurality of measurement data which are obtained by said converting means at a preselected time interval;

difference calculating means for calculating difference data between two measurement data among said large number of measurement data stored in said memory means; and display control means for controlling said pointer type display means so as to display the difference calculated by said difference calculating means with the movable pointer thereof.

11. An electronic appliance equipped with a sensor as defined by claim 10, wherein:

said movable pointer of said pointer type display means is rotatably provided within a predetermined rotation angle; and said electronic/optical digital display means displays data obtained by adding 1 to the least significant digit of said upper digit data at a substantially central portion within a rotatable range defined by said predetermined rotation angle.

12. An electronic appliance equipped with a sensor as defined by claim 10, wherein:

said pointer type display means includes electronic/optical scale display means for digitally displaying a value of data pointed out by said movable pointer when said movable pointer is located at a specific position corresponding to a position where said pointer is movable.

13. An electronic appliance equipped with a sensor as defined by claim 10, wherein:

said converting means produces a plurality of types of measurement data having a plurality of digits based on the sensor data output from said sensor, said plurality of types of measurement data being represented in different units respectively; and said electronic appliance further comprising:

selectively designating means for selectively designating one of said plurality of types of measurement data, and wherein said electronic/optical digital display means digitally displays data obtained by adding 1 to the least significant digit of said upper digit data among the measurement data designated by said selectively designating means, and said pointer type display means displays complement data of the lower digit data among the measurement data designated by said selectively designating means.

14. An electronic appliance equipped with a sensor as defined by claim 10, further comprising:

at least a second sensor for measuring a different subject from that to be measured by said sensor, said at least second sensor outputting second sensor data; and selectively designating means for selectively designating one of said sensor and said second sensor, and wherein said converting means converts sensor data output from said sensor and sensor data output from said second sensor to obtain measurement data each including a plurality of digits, and said electronic/optical digital means digitally displays data obtained by adding 1 to the least significant digit of said upper digit data among the measurement data of the sensor designated by said selectively designating means, and said pointer type display means displays complement data of said lower digit data among the measurement data of the sensor designated by said selectively designating means.

15. An electronic appliance equipped with a sensor as defined by claim 10, further comprising:

time interval designating means for designating a second time interval; and second calculating means for calculating difference data between first and second measurement data among the plurality of measurement data stored in said memory means, said first and second measurement data being obtained at substantially every time interval designated by said time interval designating means; and wherein said pointer type display means includes display control means for displaying said difference data with said movable pointer.

16. An electronic appliance equipped with a sensor as defined by claim 10, further comprising:

time counting means for determining a present time; and time display means for displaying the present time determined by said time counting means.

17. An electronic appliance equipped with a sensor as defined by claim 10, further comprising:

a case for containing said electronic appliance, said case having straps for securing said case to an operator.

18. An electronic appliance equipped with a sensor for outputting sensor data, said appliance, comprising:

converting means for converting sensor data output from the sensor to obtain measurement data having a plurality of digits;

electronic/optical digital display means for digitally displaying upper digit data including upper digits of the plurality of digits of the measurement data obtained by said converting means;

electronic/optical analog display means having a plurality of pointer display members adapted for activation;

first display control means for selectively activating the plurality of pointer display members in accordance with lower digit data, the lower digit data including lower digits of the plurality of digits of the measurement data obtained by said converting means except for the upper digits included in the upper digit data displayed on said electronic/optical digital display means;

memory means for storing a plurality of measurement data obtained by said converting means at a preselected time interval;

difference calculating means for calculating a difference between first and second measurement data among said plurality of measurement data stored in the memory means; and second display control means for selectively activating said plurality of pointer display members of said electronic/optical analog display means in accordance with the difference calculated by said difference calculating means.

19. An electronic appliance equipped with a sensor as defined by claim 18, wherein:

said electronic/optical digital display means includes means for adding 1 to a least significant digit of said upper digit data of the measurement data to obtain added data, said electronic/optical digital display means digitally displaying said added data; and said display control means including means for controlling said electronic/optical analog display means to display complement data of said lower digit data with said plurality of pointer display members.

20. An electronic appliance equipped with a sensor as defined by claim 18, wherein:

said electronic/optical digital display means displays said upper digit data at substantially the center of said plurality of pointer display members of said electronic/optical analog display means.

21. An electronic appliance equipped with a sensor as defined by claim 18, wherein:

said electronic/optical analog display means includes a scale display member for digitally displaying a value of data represented by a specific pointer display member among said plurality of pointer display members.

22. An electronic appliance equipped with a sensor as defined by claim 18, wherein:

said converting means produces a plurality of kinds of measurement data having a plurality of digits based on the sensor data output from said sensor, said plurality of kinds of measurement data being represented in different units respectively; and said electronic appliance further comprising:

selectively designating means for selectively designating one of said plurality of kinds of measurement data produced by said converting means, and wherein said electronic/optical digital display means digitally displays said upper digit data of the measurement data designated by said selectively designating means, and wherein said electronic/optical analog display means displays the lower digit data of the measurement data designated by said selectively designating means with said plurality of pointer display members.

23. An electronic appliance equipped with a sensor as defined by claim 18, further comprising:

at least a second sensor for measuring a different subject from that to be measured by said sensor, said at least second sensor outputting second sensor data; and selectively designating means for selectively designating one of said sensor and said second sensor, and wherein said converting means converts sensor data output from said sensor and said second sensor to obtain measurement data each including a plurality of digits, said electronic digital means digitally displaying said upper digit data among the measurement data of the sensor designated by said selectively designating means, and said electronic/optical analog display means displaying said lower digit data among the measurement data of the sensor designated by said selectively designating means with said plurality of pointer display members.

24. An electronic appliance equipped with a sensor as defined by claim 18, further comprising:

time interval designating means for designating a second time interval; and second calculating means for calculating difference data between first and second measurement data among the plurality of measurement data stored in said memory means, said first and second measurement data being obtained during substantially every second time interval designated by said time interval designating means; and wherein said display control means includes means for controlling said electronic/optical analog display means to display said difference data calculated by said second calculating means with said plurality of pointer display members.

25. An electronic appliance equipped with a sensor as defined by claim 18, further comprising:

time counting means for determining a present time; and time display means for displaying the present time determined by said time counting means.

26. An electronic appliance equipped with a sensor as defined by claim 18, further comprising:

a case for containing said electronic appliance, said case having straps for securing said case to an operator.

27. An electronic appliance equipped with a sensor for outputting sensor data, said appliance comprising:

converting means for converting sensor data output from the sensor to obtain measurement data having a plurality of numeral digits;

electronic/optical digital display means for digitally displaying upper digit data including upper digits of the plurality of numeral digits of the measurement data, said upper digits being added with 1;

electronic/optical analog display means having a plurality of pointer display members adapted to be activated;

first display control means for selectively activating the plurality of pointer display members in accordance with lower digit data, the lower digit data including lower digits of the plurality of digits of the measurement data obtained by said converting means except for the upper digits included in the upper digit data displayed on said electronic/optical digital display means;

memory means for storing a plurality of measurement data obtained by said converting means at a preselected time interval;

difference calculating means for calculating a difference data between first and second measurement data among said plurality of measurement data stored in the memory means; and second display control means for selectively activating said plurality of pointer display members of said electronic/optical analog display means in accordance with the difference calculated by said difference calculating means.

28. An electronic appliance equipped with a sensor as defined by claim 27, wherein:

said electronic/optical digital display means displays said upper digital data, the least significant digit included in said upper digital data being added with 1 in correspondence with a substantial center of said plurality of pointer type display members of said electronic/optical analog display means.

29. An electronic appliance equipped with a sensor as defined by claim 27, wherein:

said electronic/optical analog display means includes a scale display member for digitally displaying a value of data represented by a specific pointer display member among said plurality of pointer display members.

30. An electronic appliance equipped with a sensor as defined by claim 27, wherein:

said converting means produces a plurality of kinds of measurement data having plural digits based on the sensor data output from said sensor, said plurality of kinds of measurement data being represented in different units respectively;

said electronic appliance further comprising:

selectively designating means for selectively designating one of said plurality of kinds of measurement data produced by said converting means, and wherein said electronic/optical digital display means digitally displaying said data obtained by adding 1 to the least significant digit of said upper digit data of the measurement data designated by said selectively designating means, and said electronic/optical analog display means displays complement data of the lower digit data of the measurement data designated by said selectively designating means with said plurality of pointer display members.

31. An electronic appliance equipped with a sensor as defined by claim 27, further comprising:

at least a second sensor for measuring a different subject from that to be measured by said sensor, said at least second sensor outputting second sensor data; and selectively designating means for selectively designating one of said sensor and said second sensor, and wherein said converting means converts sensor data output from said sensor and said second sensor to obtain measurement data each including a plurality of digits, and said electronic/optical digital display means digitally displaying data obtained by adding 1 to the least significant digit of said upper digit data of the measurement data of the sensor designated by said selectively designating means, and said electronic/optical analog display means displaying complement data of said lower digit data among the measurement data of the sensor designated by said selectively designating means with said plurality of pointer display members.

32. An electronic appliance equipped with a sensor as defined by claim 27, further comprising:

time interval designating means for designating a second time interval; and second calculating means for calculating difference data between first and second measurement data among the plurality of measurement data stored in said memory means, said first and second measurement data being obtained during substantially every second time interval designated by said time interval designating means; and wherein said display control means includes means for controlling said electronic/optical analog display means to display said difference data calculated by said second calculating means with said plurality of pointer display members.

33. An electronic appliance equipped with a sensor as defined by claim 27, further comprising:

time counting means for determining a present time; and time display means for displaying the present time determined by said time counting means.

34. An electronic appliance equipped with a sensor as defined by claim 27, further comprising:

a case for containing said electronic appliance, said case having straps for securing said case to an operator.

35. An electronic appliance equipped with a sensor for outputting sensor data, said appliance comprising:

converting means for converting sensor data output by the sensor to obtain measurement data having a plurality of digits;

electronic/optical digital display means for digitally displaying upper digit data including upper digits of the plurality of digits of the measurement data;

pointer display means provided with a movable pointer movable within a movable range, said movable pointer having a reference position at substantially a center of the movable range, said movable pointer being capable of moving from the reference position in a first direction when the measurement data obtained by said converting means is larger than the upper digital data displayed by said electronic/optical digital display means, said movable pointer being capable of moving from the reference position in a second direction, when the measurement data obtained by said converting means is smaller than the upper digital data displayed by said electronic/optical digital display means, thereby indicating lower digit data including lower digits among the plurality of digits of the measurement data obtained by said converting means except the upper digits included in the upper digit data displayed by said electronic/optical digital display means, said second direction being substantially opposite the first direction;

judging means for, when a new measurement data is obtained by said converting means, determining whether the new measurement data falls within a display range, the display range being defined by data which can be displayed by said electronic/optical digital display means and a value displayed by said pointer display means;

changing means for changing the upper digital data displayed by said electronic/optical digital display means when said judging means determines that the new measurement data obtained by said converting means is not within the display range; and pointer control means for moving the movable pointer to a position corresponding to a difference between the upper digital data changed by said changing means and the new measurement data obtained by said converting means.

36. An electronic appliance as defined by claim 35, wherein:

the movable pointer of said pointer display means is rotatable within a predetermined rotatable range; and said electronic/optical digital display means displays the upper digit data substantially at a central portion of the predetermined rotatable range of the movable pointer of said pointer display means.

37. An electronic appliance as defined by claim 35, wherein:

said pointer display means includes an electronic/optical scale display means for digitally displaying a value of data indicated by said movable pointer when said movable pointer stays at a specified position within the movable range of said movable pointer.

38. An electronic appliance as defined by claim 35, wherein:

said converting means converts sensor data output from the sensor to obtain plural measurement data expressed in different units respectively;

said electronic appliance further comprising:

selecting means for selecting one of the plurality of measurement data obtained by said converting means, and wherein the measurement data selected by said selecting means is displayed by said electronic/optical digital display means and said pointer display means.

39. An electronic appliance as defined by claim 35, further comprising:

at least a second sensor for measuring a subject different from that to be measured by said sensor to output sensor data; and sensor selecting means for selecting one of said sensor and said second sensor, and wherein said converting means converts sensor data output from said sensor and said second sensor to obtain measurement data including a plurality of digits; and said electronic/optical digital display means cooperates with said pointer display means to display the measurement data obtained by said converting means based on the sensor data of the sensor selected by said selecting means.

40. An electronic appliance as defined by claim 35, further comprising:

a time counter for determining a present time; and time display means for displaying the present time determined by said time counting means.

41. An electronic appliance as defined by claim 35, further comprising:

a case for containing said electronic appliance, said case having straps for securing said case to a user.

42. An electronic appliance equipped with a sensor for outputting sensor data, said appliance comprising:

converting means for converting sensor data output by the sensor to obtain measurement data having a plurality of digits;

electronic/optical digital display means having a reference value, for digitally displaying upper digit data including upper digits among the plural digits of measurement data obtained by said converting means;

electronic/optical analog display means having first pointer display members for indicating a difference between the upper digital data displayed by said electronic/optical digital display means and the measurement data obtained by said converting means, when said measurement data is larger than said upper digital data, and second pointer display members for indicating the difference, when said measurement data is smaller than said upper digital data, which of the first and second display members are arranged to be selectively turned on to indicate data, said electronic/optical analog display means selectively turning on the first and second pointer display members to display lower digit data including lower digits among the plurality of digits included in the measurement data obtained by said converting means except the upper digits of the upper digit data displayed by said electronic/optical digital display means;

judging means for, when a new measurement data is obtained by said converting means, determining whether the new measurement data falls within a display range, the display range being defined by data which can be displayed by said electronic/optical digital display means and a value displayed by said electronic/optical analog display means;

changing means for changing the reference value of said electronic/optical digital display means when said judging means determines that the new measurement data obtained by said converting means does not falls within the display range; and display control means for controlling said electronic/optical digital display means to selectively turn on said first and second pointer display members, thereby displaying a difference between the reference value changed by said changing means and the new measurement data obtained by said converting means.

43. An electronic appliance as defined by claim 42, wherein:

said electronic/optical digital display means displays the upper digit data substantially at a center of the first and second pointer display members of said electronic/optical analog display means.

44. An electronic appliance as defined by claim 42, wherein:

said electronic/optical digital display means includes a scale display member for digitally indicating a value of data displayed by at least one of said first and second pointer display members.

45. An electronic appliance as defined by claim 42, wherein:

said converting means converts plural sensor data output from the sensor to obtain plural measurement data represented in different units respectively;

said electronic appliance further comprising:

selecting means for selecting one of the plurality of measurement data obtained by said converting means, and wherein the measurement data selected by said selecting means is displayed by at least one of said electronic/optical digital display means and said first and second pointer display members of said electronic/optical analog display means.

46. An electronic appliance as defined by claim 42, further comprising:

at least a second sensor for measuring a subject different from that to be measured by said first-mentioned sensor to output sensor data; and sensor selecting means for selecting one of said first mentioned sensor and said second sensor, and wherein:

said converting means converts sensor data output from said sensor and said second sensor to obtain a plurality of measurement data each including a plurality of digits; and said electronic/optical digital display means cooperates with said electronic/optical analog display means to display the measurement data obtained by said converting means based on the sensor data of the sensor selected by said selecting means.

47. An electronic appliance as defined by claim 42, further comprising:

a time counter for determining a present time; and time display means for displaying the present time determined by said time counting means.

48. an electronic appliance as defined by claim 42, further comprising:

a case for containing said electronic appliance; said case having straps for securing said case to a user.

* * * * *